M. H. BLANCKE.
SEMI-AUTOMATIC TURRET LATHE.
APPLICATION FILED NOV. 30, 1908.
962,000.
Patented June 21, 1910.
2 SHEETS—SHEET 2
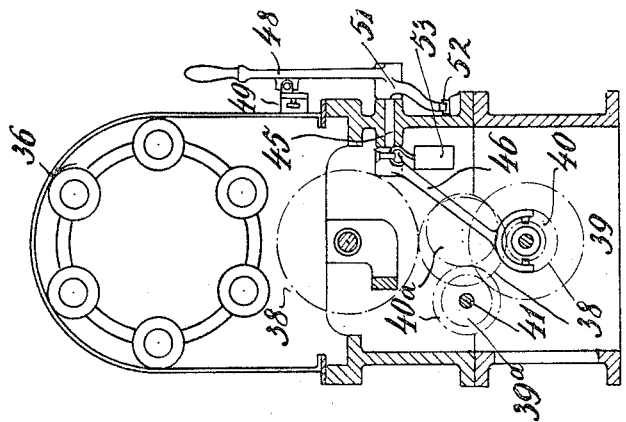
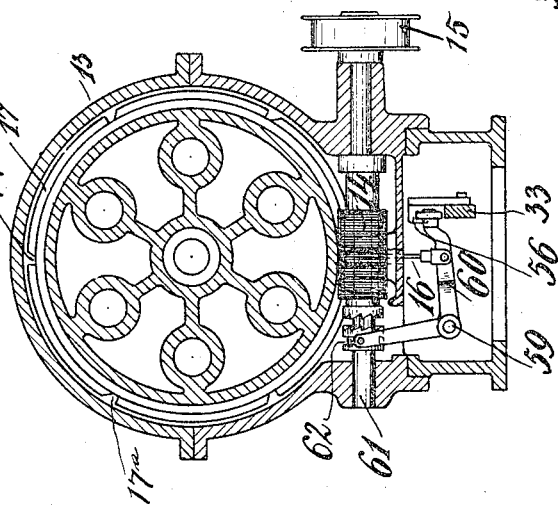
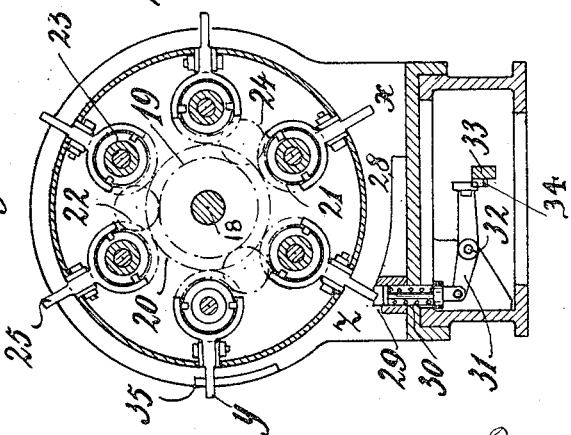
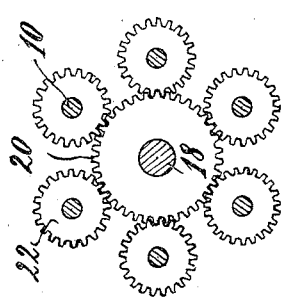
Witnesses
J. M. Wynkoop.
Ida J. Stanley.
Inventor,
Martin H. Blancke,
By Knight Bro
Attys

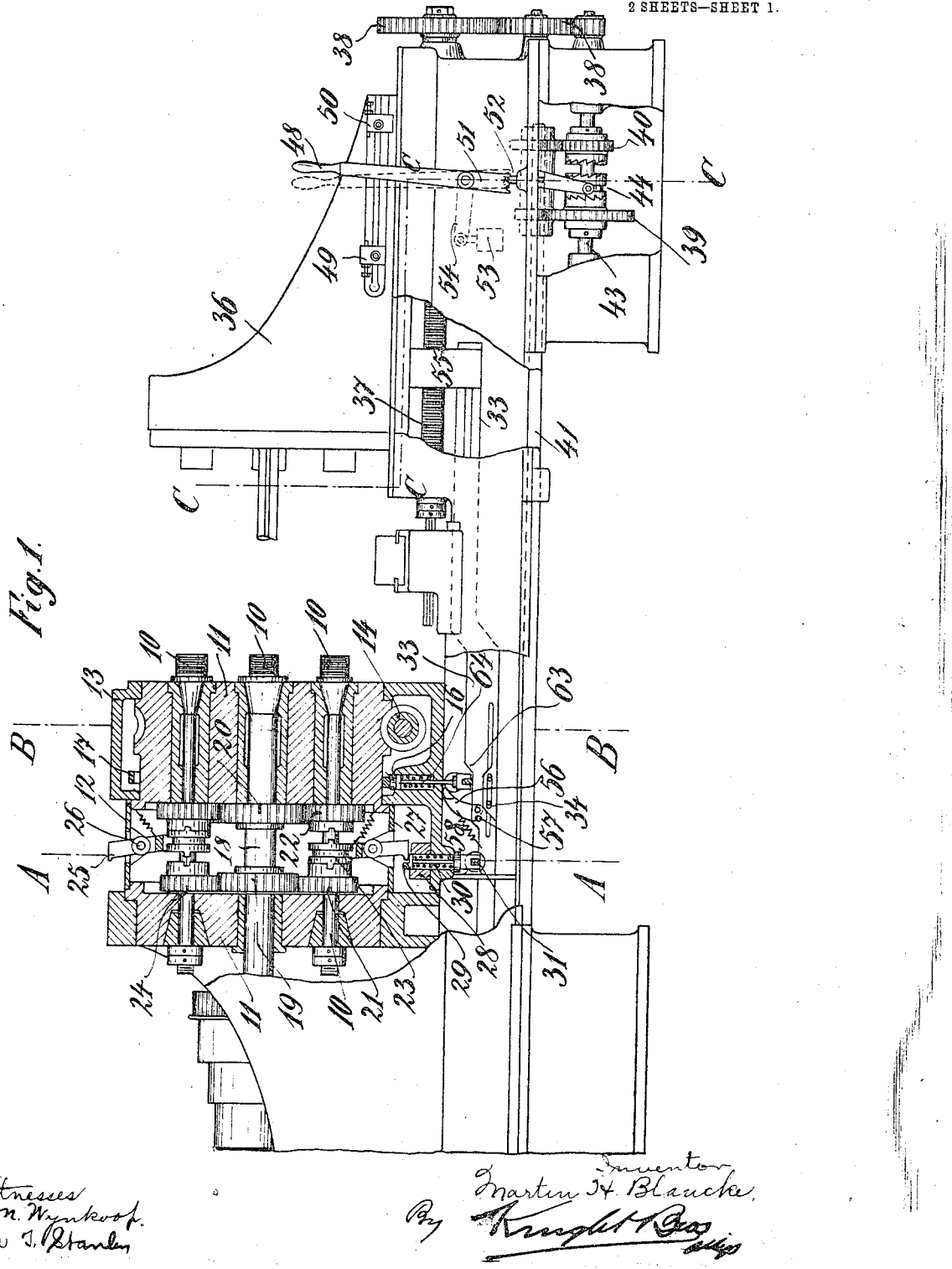

UNITED STATES PATENT OFFICE.

MARTIN H. BLANCKE, OF MERSEBURG, GERMANY.

SEMI-AUTOMATIC TURRET-LATHE.

962,000.

Specification of Letters Patent. Patented June 21, 1910.

Application filed November 30, 1908. Serial No. 465,134.

*To all whom it may concern:*

Be it known that I, MARTIN H. BLANCKE, a citizen of the German Empire, and a resident of Merseburg, Germany, have invented certain new and useful Improvements in Semi-Automatic Turret-Lathes, of which the following is a specification.

This invention consists in an improvement in multiple-spindle turret lathes in which the spindles are alternately coupled with two gears. In the present invention both gears are arranged within the turret-head, and are operated by a single shaft, the clutches for coupling the gears to the said shaft being likewise arranged within the said head, and the clutch-levers extending out of the head being operated by means of an inclined slide-way which is fixed to the bed but has a movable part for the purpose of releasing the levers; the advance of the traversing head is started by hand, all the subsequent operations in the cycle being automatically initiated by the traversing head.

A construction embodying these improvements is shown in the annexed drawings, in which,—Figure 1 is a longitudinal section of the lathe; Figs. 2, 3 and 4 are cross sections on the lines A—A, B—B, and C—C, respectively. Fig. 5 is a diagram of one of the driving gears in the turret-head.

The turret-head, which in the construction shown has six spindles 10, consists of two bearing-plates 11 connected to each other by a short cylinder 12, and is rotatable in a bearing 13. The turret-head is rotated by means of a worm 14 actuated by a pulley 15. The intermittent locking of the turret-head is effected by means of a pin 16 slidable in the bearing 13, the said pin being adapted to engage recesses 17ᵃ in a ring 17 fixed to the turret-head. The means for actuating this pin will be described hereinafter.

The spindles are operated from a central driving shaft 18, on which are mounted two wheels 19 and 20. On each spindle 10 there are two loose wheels 21 and 22 and a slidable clutch 23. The wheels 21 are connected by wheels 24, shown in dotted lines in Fig. 2, to the wheel 19, and the wheels 22 mesh directly with the wheel 20. Each of the clutches has a lever 25 pivoted to it on a pin 26, and the levers 25 project through apertures in the cylinder 12. The clutch levers 25 are attached to springs 27, which tend to hold them in engagement with the wheels 22. During the rotation of the turret-head each clutch-lever slides between *x* and *z* (Fig. 2) on an inclined guide-way 28, (Figs. 1, 2) and is thus operated to engage the clutch with the respective wheel 21 so that the rotation of the spindle is reversed. This is necessary for the operation of screw-cutting. The left-hand end (Fig. 2) of the inclined guide-way consists of a vertically movable slide 29, which is thrust upward by a spring 30. The downward movement of this slide is produced by a lever 31 pivoted at 32. This lever is actuated by means of an abutment 34 adjustable on a slidable bar 33, when the clutch-lever is to be released and the spindle is to be re-coupled with a wheel 22. The bearing 13 is also provided with a slide-way 35 (Fig. 2), the purpose of which is to so move each clutch-lever at *y* that the respective clutch 23 is moved to its central position and the spindle uncoupled from both wheels 21 and 22. The finished work is removed from the spindles in this position, and replaced by blanks.

The tool-carrier or traversing head 36 is slidable on the bed in the known manner and is actuated by a spindle 37, which receives movement from the shaft 41 by means of a train of gear wheels 38 and alternative trains of gears 39, 39ᵃ, and 40, 40ᵃ. The shaft 41 is provided with driving pulleys or other driving means. A shaft 43, on which are mounted the wheels 39 and 40, carries a clutch 44 adapted to be displaced by means of a lever pivoted at 45 on the bed. A lever 48 fixed to the pivot 45 is adapted to be actuated by means of adjustable abutments 49 and 50 on the traversing head 36. An arm 51 of the lever 48 is provided with notches which can be engaged by a spring-pressed pin 52. An arm 54 projecting from the lever 48 is weighted by means of a weight 53, or connected to a spring. The bar 33 is adjustably connected to an arm 55 of the tool-carrier. Near the pin 16 the bar 33 has a pivoted finger 56, which is normally held against an abutment 57 on the bar, by a spring 58.

At 59, on the bed, there is pivoted a bell-crank 60 connected to a clutch 62 slidable on the worm-shaft 61; to this bell-crank is pivoted the pin 16 (Fig. 3).

The action of the lathe is as follows: When the traversing head reaches its right-hand end position, the abutment 49 places the lever 48 in the position indicated by dotted lines in Fig. 1. The clutch 44 is then so placed that it clutches neither of the wheels 39 and 40, and the traversing head has no movement. When the traversing head is to advance, i. e., move toward the turret head, the lever 48 is moved by hand to the right, into the position indicated by solid lines in Fig. 1, and the clutch 44 is thus caused to engage the gear wheel 39. The threaded spindle or screw 37 is thus connected to the main shaft 41 by means of the wheels 38, 39 and 39ª. When the traversing head has moved so far forward, that its abutment 50 acts on the lever 48, the latter is moved back into the position indicated by dotted lines, and the weight 53 then rocks the lever to the left; the clutch 44 is thus caused to engage the wheel 40, and the direction of rotation of the spindle 37 is reversed. The traversing head thereupon makes its return movement. Before the advancing tools come into contact with the work on the spindles 10 a shoulder 63 of the bar 33, advancing with the tool-carrier, is pushed under the free end of the bell-crank 60 (Figs. 1 and 3), and thus locks the pin 16 in one of the notches of the ring 17, so that the turret head cannot rotate while the tool is at work. At the end of the advance of the traversing head the abutment 34 acts on the lever 31 so that the clutch-lever 25 abutting against the upper end of the slide 29 is released and is actuated by its spring 27 to move the respective clutch 23 into engagement with the wheel 22 so that the spindle 10 carrying the work which has been threaded has left hand rotation when the movement of the traversing head is reversed, in order that the cutter can be withdrawn from the thread cut. When the traversing head reaches the position in which the tools no longer engage the work, the finger 56 depresses the free end of the bell crank 60 so that the pin 16 is withdrawn from the ring 17, and the clutch 62 is caused to engage the worm 14. The turret-head is thus released and caused to rotate. Just before the traversing head reaches its right hand end position, the finger 56 releases the bell crank 60, and the spring 64 (Figs. 1 and 3) causes the pin 16 to reëngage the ring 17, the clutch 62 being at the same time disengaged from the worm 14, so that the turret-head ceases to rotate.

What I claim and desire to secure by Letters Patent is:—

1. In a turret lathe, the combination with a reciprocating tool head, of an intermittently rotatable turret head, a locking element, normally engaging said turret head, and holding the same against rotation and means carried by the tool head and reciprocable therewith to disengage said locking element from the turret head, whereby the turret head is free to rotate.

2. In a turret lathe, the combination with a reciprocating tool head and its driving mechanism, and a turret head, of a slidable bar carried by the tool head, means for automatically releasing the turret head, and means for intermittently revolving the turret head, said means being thrown into action by the said slidable bar.

3. In a turret lathe, the combination with a tool head, a sliding bar carried thereby, of a turret head, having a recessed rim, a pawl adapted to engage said recessed rim and lock the turret head against movement, gearing for rotating the turret head, a clutch, and levers, connected to said pawl and clutch, said sliding bar adapted to operate said levers whereby the pawl will be disengaged from the recessed rim, and the clutch coupled to said gear so that the turret head will be revolved.

4. In a turret lathe, the combination with a tool head and a regulating lever, gearing controlled by said lever, for moving the tool head, of adjustable abutments carried by said tool head constructed and arranged to throw the regulating lever, into a neutral position to uncouple the gears, and a weight secured to the regulating lever, to complete the throw of the lever, in one direction, whereby the gears will be coupled and the direction of movement of the tool head reversed, and a locking element adapted to engage the lower end of the regulating lever, whereby it will be held against accidental displacement.

The foregoing specification signed at Berlin, Germany, this twelfth day of November, 1908.

MARTIN H. BLANCKE.

In presence of—
HENRY HASPER,
WOLDEMAR HAUPT.